(12) United States Patent
Hershberger

(10) Patent No.: US 6,537,340 B1
(45) Date of Patent: Mar. 25, 2003

(54) PROCESS FOR RECYCLING MATERIALS USED IN WATER TREATMENT

(75) Inventor: Scott T. Hershberger, Kent, OH (US)

(73) Assignee: Upcyclers, Inc., Kent, OH (US)

( * ) Notice: Subject to any disclaimer, the term of this patent is extended or adjusted under 35 U.S.C. 154(b) by 0 days.

(21) Appl. No.: 09/583,827

(22) Filed: May 31, 2000

Related U.S. Application Data

(63) Continuation-in-part of application No. 08/904,637, filed on Aug. 1, 1997, now abandoned.
(51) Int. Cl.[7] .......................... C05F 11/02; C05D 9/00; C05D 9/02
(52) U.S. Cl. .................. 71/24; 47/DIG. 10; 71/31; 71/32; 71/903; 210/711; 405/128; 405/263
(58) Field of Search .................. 71/63, 903, 24, 71/32, 31; 210/711; 405/128, 258, 263; 47/DIG. 10

(56) References Cited

U.S. PATENT DOCUMENTS 5,417,861 A * 5/1995 Burnham .................. 210/609

OTHER PUBLICATIONS

Bugbee et al, "Alum Sludge as a Soil Amendment: Effects on Soil Properties and Plant Growth", Nov. 1995, p. 1–7.*
Elliott et al, Agronomic Effects of Land Application of Water Treatment Sludges, Journal AWWA, Apr. 1991, p. 126–131.*
Vandermeyden et al, Implementing A Beneficial Use Program for WTP Residuals: All the Work Does (Eventually) Pay Off!, Water Residuals and Biosolids Management: Approaching the Year 2000, 1995, p. 14–1:14–9.*
Cooper et al, "Dow/NSTA Summer Workshop Lesson Plan" (1998), http://thechalkboard.com/Corporations/Dow/Programs/1998_NSTA/1998%20Lessons/unit798.html.*
*Water Supply Plant Residual Management Plan,* Department of Public Service, Public Utilities Bureau, City of Akron, Ohio, May 1995.

* cited by examiner

*Primary Examiner*—Wayne A. Langel
(74) *Attorney, Agent, or Firm*—Renner, Kenner, Greive, Bobak, Taylor & Weber

(57) ABSTRACT

A conditioned alum-type water treatment residual is disclosed. A process for the conditioning of alum-type water treatment residual is likewise disclosed. The process includes dewatering the alum-type water treatment residual and conditioning by at least one method selected from the group consisting of conditioning by aging and physically turning periodically. A blended topsoil comprises conditioned alum-type water treatment residual and at least one topsoil component. A process for producing a blended topsoil with alum-type water treatment residual is disclosed. The alum-type water treatment residual is dewatered, conditioned by aging or turning periodically, and blended with topsoil components to produce a blended topsoil. The blended topsoil contains up to 50% alum-type water treatment residual by volume and preferably contains up to 30% alum-type water treatment residual by volume. The percentage of alum-type water treatment residual is dependent upon concentrations of metallic elements such as aluminum, copper, lead, zinc, and manganese, and the pH level of alum-type water treatment residual and the blended topsoil. A process for utilizing alum-type water treatment residual is also disclosed.

27 Claims, 2 Drawing Sheets

US 6,537,340 B1

PROCESS FOR RECYCLING MATERIALS USED IN WATER TREATMENT

This application is a continuation-in-part of U.S. application Ser. No. 08/904,637 filed on Aug. 1, 1997, abandoned.

TECHNICAL FIELD

This invention pertains to the use of water treatment residuals resulting from drinking water treatment. More specifically, this invention pertains to methods and apparatuses for reusing water treatment residuals, such as alum residuals, generated by drinking water treatment facilities, by converting the alum-type residuals into a form which is more beneficial than has been known heretofore. Alum-type residuals in such a form may be added to other materials to form a blended topsoil.

BACKGROUND OF THE INVENTION

Water treatment residuals are produced by drinking water supply and purification plants in the treatment process. Such residuals are produced when alum or similar materials are used to cause particulate matter in the water to precipitate. Alum-treated water is then placed in one or more sedimentation basins. While in these basins, the alum associates with raw water turbidity, causing it to precipitate, thereby simultaneously clearing the water and producing alum oi alum-polymer water treatment residual. The cleared water is then removed from the basins for further treatment for use as drinking water. Over time, the water treatment residual accumulates at the bottom of the basins. The residuals are removed from the sedimentation basins and stored in lagoons or tanks. These residuals contain raw water turbidity and unreacted alum and/or alum polymer coagulants and reactive hydroxide compounds. In the past, some alum and alum polymer water treatment residuals have been disposed of in licensed, solid-waste landfill facilities after being de-watered, such as via filter presses at the sites or by other suitable methods. In many states, current state EPA policies prohibit direct land application of alum water treatment residuals. Further, concerns have been raised and associated with landfill disposal of large volumes of alum residuals. While the waste product may not pose imminent hazards to the public or the environment, the presence of alum residuals in a landfill is generally considered to be undesirable.

One alternative to disposing of alum residuals from water treatment facilities has been to reuse the material in the environment as a blended topsoil since the residual is predominantly fine particulate soil components. However, the primary environmental concern associated with alum residual reuse as a soil additive is nutrient binding by the residual. This binding is caused by hydroxides, present in the residual, which bind nutrients such as phosphorus, making them unavailable for use by vegetation.

Another concern with using alum residual is that alum residual contains very limited concentrations of vegetation nutrients in excess of typical soils, and has a diminished value as a low-grade fertilizer in comparison to sewage sludge. However, alum residual has been shown to increase soil moisture holding capacity, which is a major problem associated with course grained or highly organic soils. Additionally, alum residual has been found to reduce the compressive strength of soils, allowing increased root penetration through the soil.

The applicant has recognized the need to provide a process for reusing or recycling alum residuals, particularly alum and alum polymer residuals. Potential uses for alum-type residuals have been considered, mainly compost blending, landfill cover material blending, land application, and topsoil blending.

Compost blending involves blending alum-type residuals with composted materials prior to sale or reuse as an enhanced topsoil material. Composted material contains many nutrients that enhance the ability of soil to sustain vegetation. However, because compost materials originate from decayed organic materials, the compost materials are more acidic than typical soils. Acidic soil conditions can cause metals to be placed in solution, creating a toxic soil condition known as phytotoxicity.

Landfill cover material blending involves blending alum residuals with materials used as cover materials at licensed solid waste disposal facilities. Currently, there is a very limited supply of materials suitable for landfill covers that are also capable of sustaining vegetation. Unprocessed alum residual, however, may not be suitable due to the presence of hydroxides noted above and concomitant nutrient binding. However, use of residuals in a waste disposal facility would allow residuals to be comingled with regulated wastes, potentially creating future remediation liability.

Direct land application involves applying dry or gelatinous alum-type residuals directly to the surface of land, such as farmland, for example. The alum-type residual may be applied to the land and later plowed into the soil to blend the alum-type residual and natural soil. Such applications are of detrimental, however, because of the gelatinous nature of alum-type residual and the potential for nutrient binding. Application of the gelatinous alum-type residual will preclude adequate mixing of the residual with the soil, leaving the alum-type residual in large clumps at or near the surface of the soil after plowing. The potential for nutrient binding by hydroxides also makes this use unattractive, especially for farmland. Additionally, in many states, current state EPA policy prohibits direct land application of such alum-type residuals. Topsoil blending involves blending alum-type residual with topsoil prior to sale or reuse as landscaping topsoil. Topsoil blending would not involve licensed waste facilities, and therefore, would pose a much lower risk for long term liability exposure than landfill cover material blending. Current methods of processing, however, are not well suited for large or small scale use because alum residuals must be granular and sufficiently dewatered for blending. Previous attempts at using alum residual as a soil additive were unable to overcome the limitations of nutrient binding caused by the presence of hydroxides.

SUMMARY OF THE INVENTION

It is therefore an object of the present invention to provide an improved method of processing alum-type residuals resulting from the treatment of water for the production of potable water.

It is another object of the present invention to provide alum-type residual in a form that is easier to work and blend with other materials than those that have been known heretofore.

It is still another object of the present invention to provide an alum-type residual with less potential for adverse chemical interactions upon mixing with other materials.

It is yet another object of the present invention to provide a process for the use of alum-type residuals from a drinking water treatment facility by processing alum-type residuals into a form which is easier to work and less reactive than previously known forms, and blending the alum-type residual with topsoil components.

It is still another object of the present invention to provide an improved blended topsoil product with improved physical properties comprising alum-type residuals and top soil components.

These and other objectives are achieved by providing a more thorough and economical method of conditioning alum-type residual than was previously known. This invention also provides a processed alum-type residual that has less reactive hydroxide components than previously known alum-type residuals. The processed alum-type residual of the present invention is also more easily mixed with other materials due to the granular texture of the processed alum-type residual. This granular texture and decreased water content of the processed residual of the present invention provides a residual that is more easily mixed with topsoil components on a large scale than was previously known.

In accordance with the present invention, a new and improved method for reusing water treatment residuals, particularly alum residuals, is provided which overcomes the problems associated with disposal of such water treatment residuals while at the same time producing a blended topsoil with improved physical characteristics.

More particularly, in accordance with the present invention, a process for conditioning alum-type residual comprises dewatering and at least one of the processes of the group consisting of aging and periodically turning. According to this aspect of the invention, residual may be conditioned by mechanically turning over an alum-type residual periodically and exposing the residual to ambient conditions. Periodic turning is believed to insure even dewatering of the residual while simultaneously allowing for the reaction of hydroxide compounds present in the residual. Likewise, the residual may also be conditioned by aging. In such a case, various environmental conditions are allowed to cause the physical breakdown of the gelatinous residual, again allowing for greater conditioning of the residual, including dewatering and reduction of active hydroxide content. A combination of these processes may also be used. Also, any of these processes may be used in conjunction with mechanical dewatering such as dewatering by using mechanical filter presses.

Also in accordance with the present invention, a process for producing an improved blended topsoil comprises the steps of conditioning alum-type residual, particularly alum-type residual, by dewatering and conditioning by aging or mechanically turning or a combination of such processes, removing the processed alum-type residual from the water treatment facility, and blending the processed alum-type residual with topsoil components to create a blended topsoil product. This method is more amenable to large scale use of alum-type residual than previous methods because the method provides a greater level of conditioning of the residual than previous methods. With greater conditioning comes a greater ease of blending the processed residual with other materials. Therefore, the processed residual of the present invention is more amenable to mixing on a large scale to form a blended topsoil than was previously known. The greater conditioning also provides for a decreased likelihood of nutrient binding in the blended topsoil.

According to one aspect of the invention, a blended topsoil includes a concentration of alum-type residual and natural topsoil.

According to another aspect of the present invention, a process for producing blended topsoil includes dewatering the alum-type residual, at least one of the steps consisting of conditioning by aging and turning of the alum-type residual produced by a drinking water treatment facility, testing the alum-type residual for concentrations of trace elements such as aluminum, copper, lead, zinc, and manganese, testing the alum-type residual for a pH greater than or equal to 6.0, and blending the alum-type residual with at least one natural topsoil component to form a blended topsoil.

According to another aspect of the present invention, a process for utilizing alum-type residuals from a water treatment facility includes the steps of dewatering the alum-type residual, conditioning the alum-type residual by at least one of the methods of the group consisting of aging the alum-type residual and periodically turning the alum-type residual, followed by blending the alum-type residual with at least one natural topsoil component to produce a blended topsoil, and using the blended topsoil as a topsoil.

One advantage of the present invention is that the process enables the reuse or recycling of alum-type residuals produced by water treatment facilities without the detrimental effects caused by the presence of active hydroxide compounds in the residual such as nutrient binding.

Another advantage of the present invention is the ability to use alum-type residuals to create a blended topsoil with enhanced physical properties.

Another advantage of the present invention is the ability to utilize alum-type residuals without negatively impacting the environment.

Yet another advantage of the present invention is the avoidance of disposal of alum-type residual in landfills, thereby decreasing the burden placed on such facilities.

Another advantage of the present invention is that an enhanced blended topsoil may be produced that increases the water holding capacity of coarse grained or highly organic materials, while decreasing the compressive strength of the blended topsoil, thereby allowing for greater root penetration by vegetation through the blended topsoil.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and herein.

DESCRIPTION OF THE PREFERRED EMBODIMENT

Figure 1:
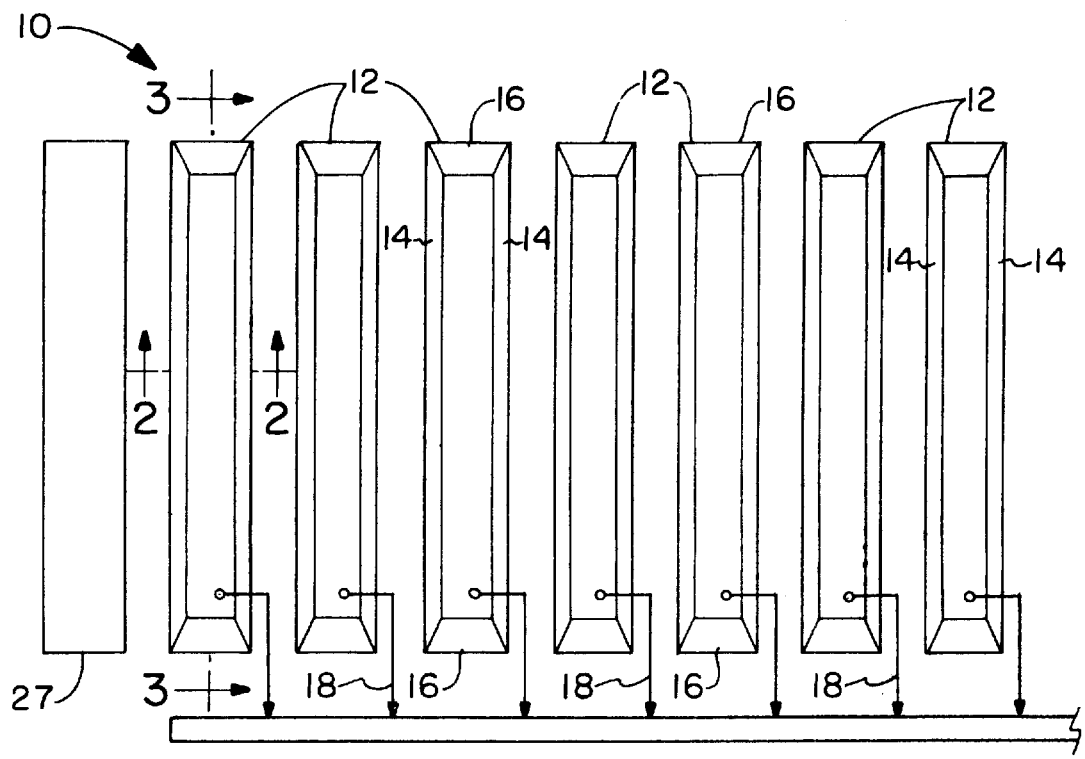
FIG. 1 is a top view of a typical conditioning facility.
Figure 2:
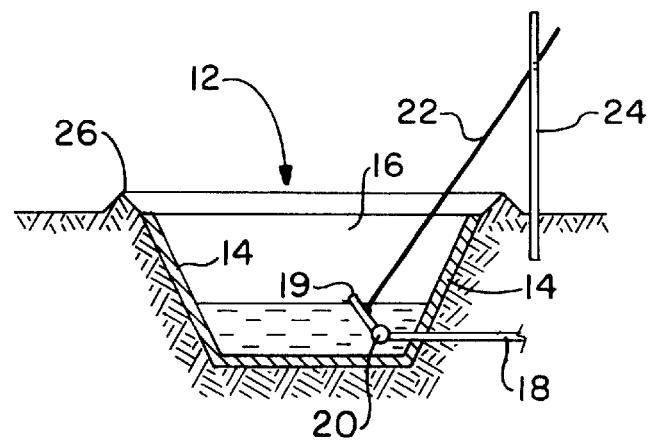
FIG. 2 is an elevational view, in section, of a conditioning cell as may be taken along line 2—2 of FIG. 1.
Figure 3:
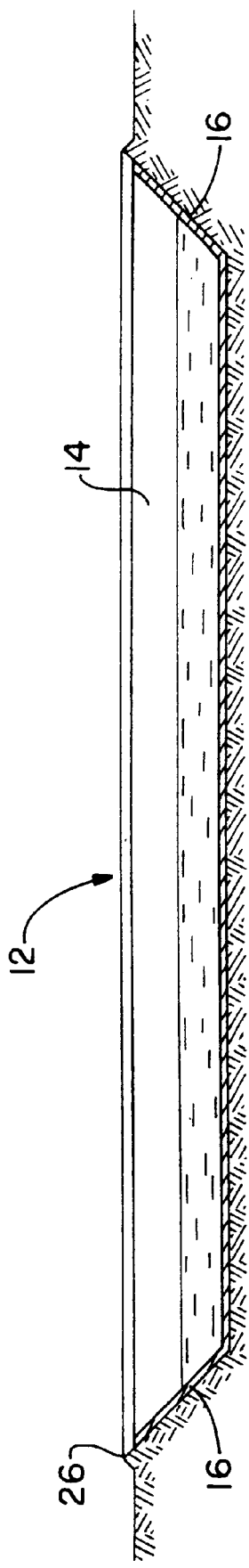
FIG. 3 is an elevational view, in section, of a conditioning cell as may be taken along line 3—3 of FIG. 1.

The method of the present invention may be described with reference to FIGS. 1–3. A conditioning facility 10 contains a plurality of conditioning cells 12. Conditioning cells 12 have side walls 14 and end walls 16. Preferably, side walls 14 and end walls 16 of conditioning cells 12 slope inwardly as shown in FIGS. 2 and 3. In a preferred embodiment, side walls 14 of conditioning cells 12 have a slope of about 2:1 and end walls 16 have a slope of about 4:1. Conditioning facility 10 also comprises decant piping 18 leading from conditioning cells 12 to an evaporation pond or other water recovery area. Preferably, a swivel joint 20 connects decant piping 18 and a piping end section 19. Piping end section 19 has an open end. The level of the open end of piping end section 19 may be adjusted by means such as an adjustment bar 22 attached to piping end section 19. Adjustment bar 22 may be used to adjust the level of the open end of piping end section 19 by adjustably attaching adjustment bar 22 to a post 24 set in the ground surrounding conditioning cell 12. Conditioning cells 12 may also be surrounded by curbing 26 to direct run-off around conditioning cells 12. Optionally, conditioning facility may also comprise a conditioned residual storage area 27.

Alum-type water treatment residual from a water treatment facility is conditioned by being placed in conditioning cells 12. In a preferred embodiment, the residual is placed in conditioning cell 12 to a maximum depth of 18 inches. Residual is permitted to settle in conditioning cells 12 over time and water remaining near the surface is removed, for example, by evaporation or by using decant piping 18 or a combination of both methods. Optionally, the bottoms of conditioning cells 12 may be porous, allowing water to escape from conditioning cells 12. When decant piping 18 is used, an open end of piping end section 19 is placed under the surface of the water and the water is removed to an evaporation pond or other water recovery area by gravity or other means. In a preferred embodiment, piping end section 19 is adjustable to maximize the amount of water removed from the residual. Alternatively, excess water may be removed from the residual by traditional means such as gravity thickeners prior to being placed in conditioning cell 12. Residual is conditioned in conditioning cells 12 by aging, by periodic mixing or turning, or both. When the residual is conditioned over time, various environmental conditions are utilized to neutralize the hydroxide compounds present in the residual and cause the physical breakdown of the gelatinous residual. Periodic mixing or turning over of the residual may also be used. Mixing conditions the residual by ensuring even evaporation of liquid from the residual and even reaction of hydroxide compounds, by bringing previously unexposed residual to the surface. Mechanical mixing of the residual and exposing the residual to ambient conditions may be coupled with arranging the residual in rows or other patterns to maximize surface area and facilitate evaporation of liquid and reaction of hydroxides. Alum-type residual may be subjected to both of these processes. These processes both produce dewatered residuals with a granular texture and allows hydroxide compounds to become nonreactive. Conditioned residual may be removed from the cells and may optionally be stored in conditioned residual storage area 27. Conditioning by mixing and aging may be continued in conditioned residual storage area 27.

The alum-type residual is subjected to at least one of these processes until it is sufficiently dry to pass through a topsoil screen. Unprocessed alum-type residual typically has a solids content of about 5 percent to about 15 percent by volume. Preferably, the residual is dried until it comprises at least about 40 percent solids by volume, and more preferably about 55 to about 65 percent solids by volume. The length of time required for this level of drying to occur will vary according to environmental conditions, such as weather and season, and the surface area to volume ratio of the residual to be processed. Generally, this process will take several weeks to occur. After sufficient drying and conditioning, the alum-type residual is then removed from the conditioning cell and transported to a soil blending location where the alum-type residual may be blended with other components to form a blended topsoil.

An enhanced topsoil blend is produced by mixing alum-type residual that has been processed as described above with topsoil components or materials such as sand, peat, native topsoil, and leaf humus at a soil blending facility. The topsoil blending ratio, defined as the percentage by volume of alum-type residual in the blended topsoil, is approximately 10–40% alum-type residual by volume. Preferably, the topsoil blending ratio is approximately 20 percent.

Pre-blended alum-type residual is typically suitable if found to contain less that 75,000 mg/kg of total aluminum, 130 mg/kg of total copper, 150 mg/kg of total lead, 250 mg/kg of total zinc, 1,500 mg/kg of total manganese, and a pH level greater than or equal to 6.0. Tests to determine the concentration of other trace elements may also be performed. Tests performed on pre-blended alum-type residual from water treatment facilities have indicated that pre-blended alum-type residual typically does not contain concentrations of aluminum, copper, lead, zinc, and manganese in excess of these ranges or ranges documented in typical soil. Levels of available phosphorus may also be tested to insure that pre-blended alum-type residuals will not cause nutrient binding when added to other materials such as topsoil components.

After blending, the final blended topsoil is considered suitable if it contains less than 50,000 mg/kg of total aluminum, 60 mg/kg of total copper, 50 mg/kg total lead, 100 mg/kg of total zinc, 1,000 mg/kg of total manganese, and a pH level greater than or equal to 5.5. These suitability standards are likely met with suitable pre-blended alum-type residual as previously defined. Additional tests may be required to establish suitability of alum-type residual derived from water sources having greater contamination risk.

The alum-type residual is preferably blended with native topsoil, peat, sand, or leaf humus. The topsoil may be blended at a commercial blending facility or any other facility capable of mixing the alum-type residual with a natural soil. The blended topsoil may then be marketed for landscaping purposes. According to the method of the present invention, alum-type water treatment residual produced by a water treatment facility is dewatered and conditioned by at least one of the methods consisting of aging and turning periodically. Preferably, the resulting alum-type residual is at least about 40–70% solids. The alum-type residual is then removed from the conditioning facility and transported to a blending facility where the processed alum-type residual may be blended with other components to form a blended topsoil.

By blending alum-type residual with topsoil, the alum-type residual may be reused or recycled in a method that produces a blended topsoil with improved properties. The blended topsoil displays increased capacity to hold soil moisture while minimizing soil compressive strength and minimizing nutrient binding. This produces a blended topsoil that retains moisture while fostering plant root growth.

Final blended material may further be sampled, and blending ratios, which are described as the percentage of alum-type residual found in the blended topsoil, may be raised to up to 50% alum-type residual if the final blended soil remains within the suitability criteria of metal levels and pH. If the concentration of any trace element in the blended topsoil is unacceptably high, the blended topsoil may be blended further with topsoil components until the trace element concentrations are lowered to acceptable levels. The blending ratio may also be varied as the chemical properties of the alum-type residual varies due to external influences such as raw water turbidity and seasonal variation. The variability of the alum-type residual is preferably identified and documented on an on-going basis to accurately document the range of chemical composition. Documentation of chemical composition should be obtained on regular intervals, first to identify variability in the material, then to document composition within a given range within extended periods of time. The final blending ratio may be increased as long as concentration levels of metals such as aluminum, copper, lead, zinc and manganese remain below the stated levels, and as long as the pH level of the blended topsoil remains above the stated level to avoid phytotoxic conditions. The following examples illustrate how the processed alum-type residual may be blended with topsoil components.

EXAMPLE 1

Table 1 shows results of eight residual samples taken from water treatment facility lagoons. For each sample, the amount of aluminum, manganese, zinc, copper and lead, and the pH level of the alum-type residual were all tested. In this example, the elements were each found to be within the suitable ranges. The final column, indicating percent of solids, reflects the drying of the alum-type residual.

TABLE I

| Sample No. | Source Location | Sample ID | pH | Al | Mn | Zn | Cu | Pb | % Solids |
|---|---|---|---|---|---|---|---|---|---|
| 1 | 16 | AWS-2 | N/A | 19200 | 635 | 49 | 13 | 5 | 77.90% |
| 2 | 16 | BGD-01 | 7.2 | 30000 | 822 | 67.8 | 33 | 12 | 54.60% |
| 3 | 16 | BGD-02 | 7.2 | 33000 | 322 | 51.5 | 16 | 10 | 44.60% |
| 4 | 22 | BGD-03 | 7.2 | 39000 | 3695 | 73.1 | 30 | 14 | 57.00% |
| 5 | 22 | BGD-04 | 7.3 | 50000 | 1170 | 67 | 32 | 15 | 49.60% |
| 6 | 22 | BGD-05 | 7 | 41000 | 1290 | 59.7 | 39 | 12 | 46.00% |
| 7 | 22 | BGD-06 | 6.95 | 38000 | 727 | 68.1 | 24 | 13 | 57.10% |
| 8 | 22 | BGD-07 | 6.9 | 38000 | 762 | 57.6 | 30 | 11 | 65.40% |

Alum-type residual samples were mixed with topsoil components to yield blended topsoil samples. The blended topsoil samples comprised from about 5 to about 15 volume percent alum-type residual. The blended topsoil samples were tested for aluminum, manganese, zinc, copper, lead, pH level, and the percentage of solid material. Table 2 shows the results of tests done to blended top soil. Once again, each of the elements were found within acceptable ranges, and the pH level was above the threshold minimum.

TABLE 2

| Sample No. | pH | Al | Mn | Zn | Cu | Pb | % Solids |
|---|---|---|---|---|---|---|---|
| 1 | N/A | 21500 | 192 | 38.2 | 14 | 5 | N/A |
| 2 | 7 | 15000 | 739 | 46.8 | 13 | 17 | 79.40% |
| 3 | 6.3 | 12500 | 727 | 52.2 | 3 | 15 | 74.90% |
| 4 | 7.05 | 8760 | 411 | 47.1 | 12 | 11 | 82.30% |
| 5 | 6.65 | 11300 | 567 | 47 | 3 | 15 | 78.50% |
| 6 | 7 | 9200 | 866 | 40.8 | 4 | 18 | 82.90% |
| 7 | 6.8 | 10100 | 616 | 47 | 7 | 14 | 81.00% |
| 8 | 6.9 | 10100 | 316 | 35 | 11 | 10 | 81.30% |
| 9 | 6.9 | 8200 | 443 | 34.6 | 14 | 13 | 78.80% |
| 10 | 7.1 | 1600 | 151 | 13.2 | 15 | 5 | 93.20% |
| 11 | 7.4 | 1400 | 227 | 11.7 | 11 | 5 | 92.40% |

All soil samples were submitted of analysis of aluminum, copper, zinc, lead, in accordance with methods 6010A, and manganese in accordance with method 4760, as established by the United States Environmental Protection Agency.

EXAMPLE 2

In Example 2, the conditioned, pre-blended alum-type residual and the final blended top soil were tested for a wider array of materials than those tested for in Example 1. Table 3 shows a listing of elements for which testing can be made to determine whether the elements occur within a specific range in parts per million. Specifically, if an element exceeds the range in parts per million, then either the pre-blended alum-type residual or the final blended top soil is not considered to be suitable. The fourth column of the table indicates the average parts per million of each element in natural soils

TABLE 3

VARIOUS ELEMENT CONTENT FOR COMMON SOILS

| ELEMENT | SYMBOL | RANGE (ppm) | AVERAGE (ppm) |
|---|---|---|---|
| Aluminum | Al | 10,000–300,000 | 71,000 |
| Arsenic | As | 1–50 | 5 |
| Barium | Ba | 100–3,000 | 430 |
| Beryllium | Be | 0.1–40 | 6 |

TABLE 3-continued

VARIOUS ELEMENT CONTENT FOR COMMON SOILS

| ELEMENT | SYMBOL | RANGE (ppm) | AVERAGE (ppm) |
|---|---|---|---|
| Boron | B | 2–100 | 10 |
| Bromine | Br | 1–10 | 5 |
| Cadmium | Cd | 0.1–0.70 | 0.06 |
| Calcium | Ca | 7,0000–500,00 | 13,700 |
| Cesium | Cs | 0.3–25 | 6 |
| Chlorine | Cl | 20–900 | 100 |
| Chromium | Cr | 1–1,000 | 100 |
| Cobalt | Co | 1–40 | 8 |
| Copper | Cu | 2–100 | 30 |
| Fluorine | F | 10–4,000 | 200 |
| Gallium | Ga | 5–70 | 14 |
| Germanium | Ge | 1–50 | 1 |
| Iodine | I | 0.1–40 | 5 |
| Iron | Fe | 7,000–550,000 | 38,000 |
| Lanthanum | La | 1–5,000 | 30 |
| Lead | Pb | 2–200 | 10 |
| Lithium | Li | 5–200 | 20 |
| Magnesium | Mg | 600–6,000 | 5,000 |
| Manganese | Mn | 20–3,000 | 600 |
| Mercury | Hg | 0.1–.03 | 0.03 |
| Molybdenum | Mo | 0.2–5 | 2 |
| Nickel | Ni | 5–500 | 40 |

TABLE 3-continued

VARIOUS ELEMENT CONTENT FOR COMMON SOILS

| ELEMENT | SYMBOL | RANGE (ppm) | AVERAGE (ppm) |
|---|---|---|---|
| Nitrogen | Ni | 200–4,000 | 1,400 |
| Phosphorus | P | 200–5,000 | 600 |
| Potassium | K | 400–30,000 | 8,300 |
| Rubidium | Rb | 50–500 | 10 |
| Scandium | Sc | 5–50 | 7 |
| Selenium | Se | 0.1–2 | 0.3 |
| Silicon | Si | 230,000–350,000 | 320,000 |
| Silver | Ag | 0.01–5 | 0.05 |
| Sodium | Na | 750–7,500 | 6,300 |
| Strontium | Sr | 50–1,000 | 200 |
| Tin | Sn | 2–200 | 10 |
| Titanium | Ti | 1,000–10,000 | 4,000 |
| Vanadium | V | 20–500 | 100 |
| Yttrium | Y | 25–250 | 50 |
| Zinc | Zn | 10–300 | 50 |
| Zirconium | Zr | 60–2000 | 300 |

EXAMPLE 3

To verify that nutrient binding will not occur with the blended topsoil of the present invention, levels of soluble phosphorous were measured in a sample of the conditioned, pre-blended residual and the blended topsoil of the present invention. Soluble phosphorus levels in parts per million (ppm) are evaluated as listed in Table 4.

TABLE 4

| Soil Test Rating | Phosphorus levels (ppm) |
|---|---|
| Very Low | 0–4.5 |
| Low | 4.5–7.5 |
| Medium | 7.5–15 |
| High | 15–22.5 |
| Very High | 22.5–45 |
| Extremely High | 45 + |

The phosphorus level of the conditioned pre-blended alum-type residual was found to be 7 parts per million. This level is at the higher end limit of the "Low" phosphorus level. Blended topsoil using this conditioned residual was found to contain a phosphorus level of 18.5 parts per million, which represents a high level of phosphorus. Therefore, it is evident that the conditioned alum-type residual of the present invention does not bind nutrients required by plants, such as phosphorus. It is also evident that the conditioned residual may also be used to comprise a blended topsoil which is not impaired by nutrient binding.

Based upon the foregoing disclosure, it should now be apparent that the use of the process for conditioning of alum-type residuals described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, top soil components according to the present invention are not necessarily limited to those having sand, peat, native topsoil, and leaf humus. Likewise, the period of time required for conditioning may vary according to environmental conditions and the frequency of use of combinations of conditioning techniques. Thus, the scope of the invention shall include all modifications and variations that may fall within the scope of the attached claims.

What is claimed is:

1. An alum-containing water treatment residual comprising at least about 40 percent by volume, alum-containing residual solid material and at least about 4.5 parts per million soluble phosphorus.

2. The alum-containing water treatment residual of claim 1, wherein the alum-containing water treatment residual comprises at least about 55 percent by volume alum-containing residual solid material.

3. The alum-containing water treatment residual of claim 1, wherein the alum-containing water treatment residual has a pH of at least about 6.

4. The alum-containing water treatment residual of claim 3, further comprising:

less than 75,000 mg of aluminum per kilogram of said alum-containing water treatment residual;

less than 140 mg of copper per kilogram of said alum-containing water treatment residual;

less than 150 mg of lead per kilogram of said alum-containing water treatment residual;

less than 250 mg of zinc per kilogram of said alum-containing water treatment residual; and less than 1500 mg of manganese per kilogram of said alum-containing water treatment residual.

5. The alum-containing water treatment residual of claim 1, wherein said alum-containing water treatment residual comprises at least about 4.5 parts per million soluble phosphorus without supplemental fertilization.

6. A method of conditioning alum-containing water treatment residual comprising the steps of:

subjecting alum-containing water treatment residual to dewatering;

subjecting alum-containing water treatment residual to at least one process selected from the group consisting of conditioning by aging and periodic turning to create a conditioned residual; and testing the conditioned residual for a soluble phosphorus level of at least about 4.5 parts per million, wherein the at least one process selected from the group consisting of conditioning by aging and periodic turning to create a conditioned residual is continued until the alum-containing water treatment residual comprises at least about 40 percent by volume alum-containing residual solid material and at least about 4.5 parts per million soluble phosphorus.

7. The method of claim 6, further comprising the steps of:

testing the residual to determine the concentration of at least one trace element other than phosphorus; and comparing said concentration of at least one trace element other than phosphorus to predetermined level ranges.

8. The method of claim 7, wherein the at least one trace element other than phosphorus is selected from the group consisting of aluminum, arsenic, barium, beryllium, boron, bromine, cadmium, calcium, cesium, chlorine, chromium, cobalt, copper, fluorine, gallium, germanium, iodine, iron, lanthanum, lead, lithium, magnesium, manganese, mercury, molybdenum, nickel, nitrogen, potassium, rubidium, scandium, selenium, silicon, silver, sodium, strontium, tin, titanium, vanadium, yttrium, zinc, and zirconium.

9. The method of claim 6, wherein the resulting conditioned alum-containing water treatment residual comprises at least 55 percent by volume alum-containing residual solid material.

10. The method of claim 6, further comprises the step of testing the residual for a pH of at least about 5.5.

11. The method of claim 6, wherein the resulting conditioned alum-containing water treatment residual comprises at least 4.5 parts per million soluble phophorus without supplemental fertilization.

12. A blended topsoil comprising:
   a concentration of alum-containing water treatment residual containing at least about 4.5 parts per million soluble phosphorus and at least about 40 percent by volume alum-containing residual solids; and
   topsoil components.

13. The blended topsoil of claim 12, wherein the alum-containing water treatment residual comprises at least about 55 percent by volume alum-containing residual solids.

14. The blended topsoil of claim 12, wherein the blended topsoil comprises up to about 50 percent by volume alum-containing water treatment residual.

15. The blended topsoil of claim 12, further comprising:
   less than 50,00 mg of aluminum per kilogram of said blended topsoil;
   less than 60 mg of copper per kilogram of said bleded topsoil;
   less than 50 mg of lead per kilogram of said blended topsoil;
   less than 100 mg of zinc per kilogram of said blended topsoil; and
   less than 1,000 mg of manganese per kilogram of said blended topsoil.

16. The blended topsoil of claim 12 having a pH greater than or equal to 5.5.

17. The blended topsoil of claim 12, wherein the alum-containing water treatment residual comprises at least about 4.5 parts per million soluble phosphorus without supplemental fertilization.

18. A method for producing a blended topsoil comprising the steps of:
   subjecting alum-containing water treatment residual produced by a water treatment facility to dewatering and at least one process selected from the group consisting of conditioning by aging and periodic turning, until the residual is at least about 40 volume percent alum-containing residual solid material and has a soluble phosphorus level of at least about 4.5 parts per million; and
   blending said alum-containing water treatment residual with at least one topsoil component to produce a blended topsoil containing up to about 50 percent alum-containing water treatment residual by volume.

19. The method of claim 18, further comprising the steps of:
   testing said blended topsoil for the levels of aluminum, copper, lead, zinc, and manganese;
   testing said blended topsoil for a pH of at least 5.5; and
   adjusting the percentage of alum-containing water treatment residual blended with said at least one topsoil component such that the pH level of said blended topsoil is greater than or equal to 5.5, and concentrations of trace elements are below the following levels:
      less than 50,000 mg of aluminum per kilogram of said blended topsoil;
      less than 60 mg of copper per kilogram of said blended topsoil;
      less than 50 mg of lead per kilogram of said blended topsoil;
      less than 100 mg of zinc per kilogram of said blended topsoil; and
      less than 1,000 mg of manganese per kilogram of said blended topsoil.

20. The method of claim 19, additionally comprising testing the concentration of at least one trace element selected from the group consisting of arsenic, barium, beryllium, boron, bromine, cadmium, calcium, cesium, chlorine, chromium, cobalt, fluorine, gallium, germanium, iodine, iron, lanthanum, lithium, magnesium, mercury, molybdenum, nickel, nitrogen, potassium, rubidium, scandium, selenium, silicon, silver, sodium, strontium, tin, titanium, vanadium, yttrium, and zirconium; and comparing said concentration of at least one trace element to a predetermined level.

21. The method of claim 18, further comprising the steps of:
   testing said alum-containing water treatment residual for concentrations of trace elements other than phosphorus; and
   testing said alum-containing water treatment residual for a pH level of at least 6.

22. The method of claim 18, wherein the alum-containing water treatment residual subjected to dewatering and at least one process selected from the group consisting of conditioning by aging and periodic turning, has a soluble phosphorus level of at least about 4.5 parts per million without supplemental fertilization.

23. An alum-containing water treatment residual comprising at least about 40 percent by volume alum-containing residual solid material, wherein said alum-containing water treatment residual does not bind nutrients required for plant growth.

24. The alum-containing water treatment residual of claim 23, wherein said alum-containing water treatment residual does not bind phosphorus.

25. A blended topsoil comprising:
   a concentration of alum-containing water treatment residual containing at least about 40 percent by volume alum-containing residual solids, wherein the alum-containing water treatment residual does not bind phosphorus; and
   topsoil components.

26. A method of conditioning alum-containing water treatment residual comprising subjecting alum-containing water treatment residual produced by a water treatment facility to dewatering and at least one process selected from the group consisting of conditioning by aging and periodic turning, until the residual is at least about 40 volume percent alum-containing residual solid material and does not bind phosphorus.

27. A method for producing a blended topsoil comprising the steps of:
   subjecting alum-containing water treatment residual produced by a water treatment facility to dewatering and at least one process selected from the group consisting of conditioning by aging and periodic turning, until the residual is at least about 40 volume percent alum-containing residual solid material and does not bind phosphorus; and
   blending said alum containing water treatment residual with at least one topsoil component to produce a blended topsoil containing up to about 50 percent alum-containing water treatment residual by volume.

* * * * *